(12) United States Patent
Jackson et al.

(10) Patent No.: US 7,744,803 B2
(45) Date of Patent: Jun. 29, 2010

(54) PHOTO-CROSSLINKABLE POLYOLEFIN COMPOSITIONS

(75) Inventors: Peter Jackson, Ontario (CA); Eileen Wan, Toronto (CA)

(73) Assignee: ShawCor Ltd., Toronto (CA)

( * ) Notice: Subject to any disclaimer, the term of this patent is extended or adjusted under 35 U.S.C. 154(b) by 286 days.

(21) Appl. No.: 11/680,068

(22) Filed: Feb. 28, 2007

(65) Prior Publication Data

US 2008/0045619 A1    Feb. 21, 2008

Related U.S. Application Data

(60) Provisional application No. 60/821,198, filed on Aug. 2, 2006.

(51) Int. Cl.
*B29C 35/08* (2006.01)
*C08F 2/48* (2006.01)

(52) U.S. Cl. ............... 264/477; 427/517; 427/508; 264/494; 522/150; 522/153

(58) Field of Classification Search ............... 264/477, 264/496; 522/129, 150, 153; 427/508, 517
See application file for complete search history.

(56) References Cited

U.S. PATENT DOCUMENTS

| | | | |
|---|---|---|---|
| 4,279,717 A | 7/1981 | Eckberg et al. | |
| 4,310,469 A | 1/1982 | Crivello | |
| 4,374,066 A | 2/1983 | Crivello et al. | |
| 5,073,643 A | 12/1991 | Crivello | |
| 5,505,900 A | 4/1996 | Suwanda et al. | |
| 5,709,948 A * | 1/1998 | Perez et al. | 428/413 |
| 6,054,007 A * | 4/2000 | Boyd et al. | 156/245 |
| 6,265,460 B1 | 7/2001 | Kawate et al. | |
| 6,365,643 B1 | 4/2002 | Oestreich | |
| 6,562,415 B2 | 5/2003 | Ruepping | |
| 6,602,557 B2 | 8/2003 | Ruepping | |
| 6,784,223 B2 | 8/2004 | Krohn | |
| 6,790,874 B2 | 9/2004 | Lau et al. | |
| 6,815,034 B2 | 11/2004 | Chang et al. | |
| 6,863,701 B2 | 3/2005 | Crivello | |
| 6,998,425 B2 | 2/2006 | Chisholm et al. | |
| 2005/0136252 A1 | 6/2005 | Chisholm et al. | |
| 2008/0214699 A1 * | 9/2008 | Halahmi et al. | 523/222 |

FOREIGN PATENT DOCUMENTS

| | | |
|---|---|---|
| CA | 2413759 | 12/2002 |
| CA | 2464047 | 6/2003 |
| CA | 2476323 | 8/2003 |
| DE | 102004061982 | 7/2006 |
| EP | 0490854 A2 | 6/1992 |
| WO | WO2006072310 | 7/2006 |
| WO | WO2006072338 | 7/2006 |

\* cited by examiner

*Primary Examiner*—Susan W Berman
(74) *Attorney, Agent, or Firm*—DeLio & Peterson, LLC; Peter W. Peterson

(57) ABSTRACT

A photo-crosslinkable polyolefin composition comprises a polyolefin, a source of functionality receptive to crosslinking by UV radiation, a cationic photoinitiator and optionally includes a free-radical photoinitiator, a crosslinking accelerator or sensitizer, and other additives such as compatibilizers, inorganic fillers, nanofillers, glass, polymeric and ceramic microspheres, glass fibres, flame retardants, antioxidants, stabilizers, processing aids, foaming agents and pigments. A method for manufacturing a UV-crosslinked polyolefin article comprises forming an article by extruding, moulding or otherwise forming the UV-crosslinkable polyolefin composition and subjecting the article to UV radiation on-line with the extrusion, moulding or other forming operation.

30 Claims, No Drawings

PHOTO-CROSSLINKABLE POLYOLEFIN COMPOSITIONS

FIELD OF THE INVENTION

The present invention relates to polymer compositions, articles made therefrom, and methods for the production and processing of these compositions and articles. More particularly, the compositions according to the invention are polyolefin-based compositions and are crosslinkable by exposure to ultraviolet radiation. The articles according to the invention are coatings and insulating materials. The invention allows on-line crosslinking of the polymer during production of the articles.

BACKGROUND OF THE INVENTION

Due to an attractive balance of performance and cost, polyolefin resins, such as polyethylenes, polypropylenes, copolymers of ethylene and propylene, and compositions based thereon, are widely used in coating and insulation applications. These applications include: heat-shrinkable corrosion-protection sleeves for oil and gas pipeline joints; solid and foamed coatings for the corrosion, mechanical and thermal protection of pipelines and pipeline structures; wire and cable insulations and jacketing; and heat-shrinkable extruded tubing or molded shapes for the electrical insulation and mechanical protection of wires, cables, connectors, splices and terminations.

Many of these applications require that the coating or insulating material provide acceptable thermal and mechanical performance at temperatures close to or above the softening or melting point of the thermoplastic polyolefin resin(s) from which it is made. Such performance requirements include, but are not limited to, long-term continuous operating temperature, hot deformation resistance, hot set temperature, chemical resistance, tensile strength and impact resistance. To achieve these requirements it is necessary to impart some thermoset characteristic to the resin or polymer. This is accomplished by crosslinking the molecular structure of the polymer to some required degree. Crosslinking renders the material resistant to melting and flowing when it is heated to a temperature close to or above the crystalline melting point of the highest melting point polymeric component of the composition. This property is also necessary for the production of heat-shrinkable articles, such as pipe joint protection sleeves, where crosslinking imparts controlled shrinkage, or heat recovery, characteristics, and prevents the material from melting when it is heated to the temperature necessary to effect heat recovery.

Crosslinking, or curing, of polyolefin-based coatings or insulating materials is typically accomplished through one of two basic methods: by irradiation, such as exposure to electron beam radiation; or by thermo-chemical reaction, such as that induced by peroxide decomposition or silane condensation. The advantages and disadvantages of these methods are noted below.

Irradiation of the polymer by electron beam generates free-radicals on the polymer chains which then covalently combine to effect crosslinking of the polymer. It is an instantaneous and clean method, but requires expensive, and potentially dangerous, high voltage "electron-beam" equipment. It also has limitations in terms of the product thickness and configuration that can be crosslinked uniformly.

Peroxide crosslinking is also a free-radical process but here the free-radicals are chemically generated through decomposition of the peroxide by heat. The process is thickness independent but needs substantial amounts of heat to effect crosslinking, is performed at relatively low processing speeds, and is frequently coupled with cumbersome and expensive processing equipment, such as pressurized steam or hot-gas caternary lines. A major disadvantage of using the high temperatures required to induce peroxide crosslinking (typically 200 to 350° C.) is potential softening, damage, and oxidative degradation of the polymer.

Silane crosslinking, also known as moisture crosslinking, occurs via hydrolysis and condensation of silane functionality attached to the polymer to be crosslinked. It is a relatively inexpensive process but requires a preliminary silane grafting or copolymerization operation, has restrictions in terms of polymer formulation flexibility, and is very time dependent, requiring many hours or days in a hot, moist environment to achieve full crosslinking of the polymer.

Typically, the crosslinking operations described above are performed as separate and discrete processes subsequent to melt processing, or forming, of the polymer article. It is, however, advantageous in terms of production efficiency, product throughput, and operating cost to perform the crosslinking operation at the same time as, and on-line with, the polymer processing, or forming, operation, and immediately following solidification of the formed article.

Of the methods described above, only the peroxide method realistically provides the opportunity of crosslinking in situ or "on-line" with the polymer processing or forming operation. The size, complexity, and safety risks of an electron beam typically preclude its use as an on-line crosslinking device. In the case of silane crosslinking, the crosslinking reaction can only be accomplished off-line since it is a highly time-dependant reaction, influenced by the diffusion of moisture into the polymer.

Crosslinking using ultra-violet (UV) radiation, namely radiation in the range of 200 to 500 nanometers wavelength, and also known as photo-crosslinking, provides a potential solution to the problems described. Compared with electron beam irradiation, the UV source required to effect crosslinking is relatively small, more easily configurable, less expensive and safer to use. It offers the potential of a portable crosslinking device which can be moved into position downstream of the polymer melt processing, or forming, operation. For example, the device may be positioned between an extruder and a product handling, or wind-up, station of a continuous polymer extrusion process, to allow on-line crosslinking of an extruded article, such as sheet, tubing, or wire insulation.

There are two primary methods of crosslinking or polymerization using UV radiation: free-radical and ionic.

UV free-radical crosslinking results from a reaction involving a photoinitiator, such as benzophenone, benzyldimethylketal and acylphosphine oxides, which absorbs UV light to dissociate into free radicals which can then initiate the crosslinking or polymerization reaction. A multi-functional crosslinking agent, such as triallyl cyanurate or trimethylolpropane triacrylate, may be additionally incorporated to achieve higher levels of crosslinking.

Unfortunately, a major disadvantage of UV free-radical crosslinking has been that it cannot readily be used for crosslinking thick or solid polymer sections, such as the functional thicknesses required for the pipe coatings, heat-shrinkable coverings, and wire and cable insulations described above. This is because of the relatively weak intensity of UV light which results in poor penetration of the radiation through the solid material, compared with electron beam radiation, for example. This is particularly the case with semi-crystalline polymeric materials, such as polyolefins, where the dense crystalline regions are relatively impenetrable to UV radiation. The effectiveness of UV free-radical crosslinking is also compromised if the resin to be crosslinked comprises additional materials such as filler and stabilizer additives, since these can provide further barriers to penetration by the UV light as well as interfering with the crosslinking reaction by neutralizing the free-radicals required for crosslinking. In addition, UV free-radical crosslinking is severely inhibited by the presence of oxygen, and for this reason is ideally performed in an inert atmosphere, such as nitrogen.

Traditionally, therefore, the use of UV free-radical crosslinking has been restricted to the curing or polymerization of liquid or low viscosity functional monomers or oligomers, such as acrylates, methacrylates and unsaturated polyesters, in thin (typically less than 0.250 mm., more typically less than 0.100 mm.) coating applications, such as film coatings, paints, inks, and varnishes, or for sealants and pressure sensitive adhesives, whereby the liquid or low viscosity monomers or oligomers are converted to a solid or gel-like material.

UV crosslinking by ionic reaction, that is anionic or cationic polymerization, and more particularly cationic polymerization, has historically found limited use compared with the UV free-radical process due to the unavailability of effective cationic photoinitiators. However, recent technical advances in cationic photochemistry are now making this technique more attractive for commercial applications. The process relies on the cationic polymerization of epoxy, oxetane, vinyl ether and similar functionalities by strong protonic acids created by the UV irradiation of onium salts, such as aryldiazonium salts, triarylsulphonium and diaryliodonium salts, for example. The first type generates Lewis acids whilst the last two types produce Bronsted acids, these being preferable as initiating entities for cationic polymerization.

A very useful feature of cationic polymerization is that the reaction is mostly thickness independent and will continue to proceed to completion "in the dark" after the UV source has been removed. In addition, the cationic photoinitiation reaction is not inhibited by oxygen as is free-radical photoinitiation.

An example of a typical cationic reaction mechanism is shown below in relation to the polymerization of a cycloaliphatic epoxide.

Reaction Step 1: On UV irradiation, the cationic photoinitiator interacts with active hydrogen naturally present to produce a strong protonic, Triarylsulphonium Salt $H^+(MF_6)^-$ + Aryl By-Products Bronsted Acid -where M is a metal, typically phosphorus or antimony or Bronsted, acid, and various aryl sulphur compounds:

Reaction Step 2: The acid will protonate epoxy, or oxirane, groups, and polymerization then proceeds by ring-opening reaction:

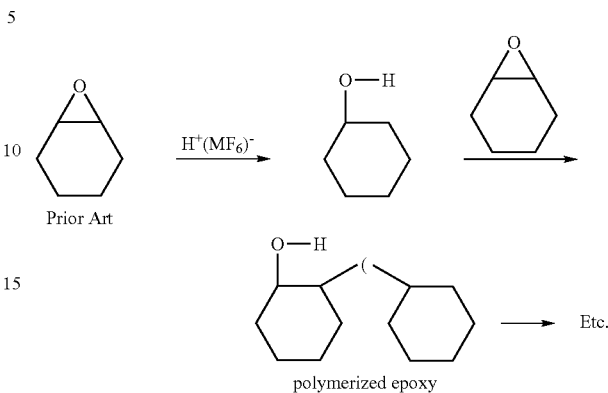

Prior Art polymerized epoxy

European Patent 0490854A2 describes one attempt to address the problem of crosslinking relatively thick extruded polyethylene materials by UV radiation (in this case an extruded strip of thickness 0.5 mm.). A proprietary benzophenone free-radical photoinitiator having low vapour pressure and high polymer solubility is used in combination with a crosslinking promoter to effect rapid crosslinking of extruded polyethylene. However, due to the problems associated with UV penetration described earlier, the crosslinking operation needs to be carried out in the melt, in other words before the polymer has solidified or crystallized. This severely restricts the use of this method in most extrusion operations, where it is necessary to shape the polymer and cool the material below its melting point immediately after exiting the extruder die. Crosslinking of the polymer in the melt state necessarily fixes the shape of the extrudate or dramatically increases the material viscosity, thereby limiting any downstream sizing or shaping operations that may need to be performed. It is also practically very difficult to insert a UV radiation device between the extruder die and adjacent cooling equipment, such as a water trough or casting stack, without severely impeding the overall extrusion operation.

Japanese Patent Application 05024109A2 uses a similar free-radical technique to crosslink an extruded polyolefin tube which is then expanded to create a heat-shrinkable tubular product. Again this process is performed in the melt state, so the limitations described above remain unaddressed.

SUMMARY OF THE INVENTION

The present invention overcomes the above-mentioned deficiencies of UV crosslinking and the above-mentioned prior art by providing a means whereby extruded, moulded or formed polyolefin and polyolefin-based materials, of the functional thicknesses required for applications such as pipe coatings, heat-shrinkable coverings and wire and cable insulations, can be crosslinked in the solid state. In addition, crosslinking is not restricted to being performed as a separate operation subsequent to, the extrusion, moulding or forming operation.

In one aspect, the present invention provides UV-crosslinkable polyolefin compositions comprising a polyolefin; a source of functionality receptive to crosslinking by UV radiation, preferably a polymer, and more preferably a polyolefin, copolymerized or grafted with said functionality, where said functionality is cationically polymerizable, or a combination of cationically and free-radically polymerizable functionalities; a cationic photoinitiator; an optional free-radical photoinitiator; an optional crosslinking accelerator or sensitizer; and optional additives such as compatibilisers, inorganic fillers, nanofillers, glass and ceramic microspheres, glass fibres, flame retardants, antioxidants, stabilizers, processing aids, foaming agents, peroxides, and pigments.

In another aspect, the present invention provides a method for manufacturing a UV-crosslinkable polyolefin article, whereby an extruded, moulded or formed article comprising the materials described above is subjected to UV radiation on-line with the extrusion, moulding or forming operation.

In yet another aspect, the present invention provides a UV-crosslinkable polymer composition, comprising: (a) a polyolefin selected from one or more members of the group consisting of polyethylene and polypropylene, and copolymers and terpolymers thereof; (b) cationically polymerizable functional groups; and (c) a cationic photoinitiator in an amount effective to initiate curing of said composition.

In yet another aspect, the present invention provides UV-crosslinked articles comprised of a polymer composition, the polymer composition comprising: (a) a polyolefin selected from one or more members of the group consisting of polyethylene and polypropylene, and copolymers and terpolymers thereof; (b) cationically polymerizable functional groups; and (c) a cationic photoinitiator in an amount effective to initiate curing of said composition; wherein the article is crosslinked by exposure to UV radiation and possesses a sufficient degree of crosslinking such that when the article is heated to a temperature above the crystalline melting point of the polyolefin, it is softened but does not become liquid.

In yet another aspect, the present invention provides a process for preparing a UV-crosslinked, thermoset article, comprising: (a) forming a blend comprising: (i) a polyolefin selected from one or more members of the group consisting of polyethylene and polypropylene, and copolymers and terpolymers thereof; (ii) cationically polymerizable functional groups; and (iii) a cationic photoinitiator in an amount effective to initiate curing of said composition; (b) melt processing the blend to produce a melt-processed article having a first set of dimensions; (c) cooling the melt-processed article to a solid state; and (d) crosslinking the melt-processed article by exposure to UV radiation to thereby produce said UV-crosslinked, thermoset article, wherein the crosslinking imparts thermoset characteristics to the article such that, when the article is heated to a temperature above the crystalline melting point of the polyolefin, it is softened but does not become liquid.

The process may further comprise the steps of:

(e) heating the UV-crosslinked, thermoset article to a first temperature at which it is softened but not melted; (f) stretching the softened article such that the article is expanded beyond the first set of dimensions; and (g) cooling the stretched article to a second temperature below the temperature at which the article is softened while holding the article in its stretched form.

DETAILED DESCRIPTION OF PREFERRED EMBODIMENTS

Composition

Polyolefin Component:

The polyolefin component is selected from one or more members of the group comprising polyethylene and polypropylene, and copolymers and terpolymers thereof.

In one embodiment, the polyolefin component is selected from the group comprising polyethylene, copolymers of ethylene and terpolymers of ethylene.

The polyethylene may be selected from the group comprising very low density polyethylene (VLDPE), low density polyethylene (LDPE), linear low density polyethylene (LLDPE), medium density polyethylene (MDPE), linear medium density polyethylene (LMDPE), high density polyethylene (HDPE) and blends thereof.

The terms HDPE, MDPE and LDPE as used herein are defined in accordance with the American Society for Testing and Materials (ASTM) D1248 standard definitions. LDPE is defined to have a density from 0.910 to 0.925 $g/cm^3$, MDPE has a density ranging from 0.926 to 0.940 $g/cm^3$ and HDPE has a density of at least 0.941 $g/cm^3$. The density of VLDPE ranges from about 0.880 to 0.910 $g/cm^3$, while the densities of LLDPE and LMDPE generally fall within the same ranges as LDPE and MDPE, respectively. The polyethylene includes ethylene homopolymers, as well as copolymers and terpolymers in which ethylene is copolymerized with one or more higher alpha olefins such as propene, butene, hexene and octene[PJ1].

The copolymers of ethylene may also be selected from ethylene propylene, ethylene vinyl acetate, ethylene vinyl alcohol, ethylene methyl acrylate, ethylene ethyl acrylate, and ethylene butyl acrylate. The terpolymers of ethylene may also be selected from ethylene methyl, ethyl or butyl acrylates with maleic anhydride or glycidyl methacrylate, ethylene propylene diene terpolymers, and ethylene propylene with maleic anhydride or glycidyl methacrylate.

In another embodiment, the polyolefin component is selected from the group comprising polypropylene, copolymers of propylene and terpolymers of propylene. The polypropylene may be selected from the group comprising predominantly isotactic polypropylene. The polypropylene includes propylene homopolymers as well as copolymers and terpolymers of propylene with other alpha olefins such as ethylene and butene.

The copolymers and terpolymers of propylene may also be selected from propylene with maleic anhydride or glycidyl methacrylate, and ethylene propylene diene terpolymers such as ethylene propylene norbornene.

The polymers comprising the polyolefin component may preferably be manufactured using metallocene catalysts, also known as single-site, stereo-specific or constrained geometry catalysts, and may also comprise a bimodal molecular weight distribution.

The polyolefin component is added to the composition in an amount ranging from 10 to 98 percent by weight, preferably in the range from 50 to 95 percent by weight.

Cationically Polymerizable Functional Component:

The component which comprises cationically polymerizable functional groups may comprise polymers, such as polyolefins, containing cationically polymerizable functional groups such as glycidyl methacrylate-, epoxy-, oxetane- and vinyl ether-based functionalities. For example, the functional polymers may be selected from polyethylene or polypropylene homopolymers and copolymers grafted, copolymerized or blended with one or more cationically polymerizable functional groups. Alternatively, the functional component may be one or more additives comprising functional monomers or oligomers, i.e. monomers or oligomers containing cationically polymerizable functional groups. These additives may be in the form of solid or liquid additives.

The cationically polymerizable functional groups may be selected from the group comprising: glycidyl methacrylates, glycidyl ethers, vinyl ethers, divinyl ethers, epoxides, diepoxides, oxazolines, oxetanes, epoxy acrylates, epoxy silanes, epoxy siloxanes, and polyols, and blends thereof.

In one embodiment, the cationically polymerizable functional groups are covalently bonded to the polyolefin component of the composition, described above. This may typically be accomplished by direct copolymerization of a functional monomer with the olefin monomer or monomers, or by grafting the functional monomer onto the polyolefin molecule using a peroxide free-radical initiator such as dicumyl peroxide, for example.

In another embodiment, the cationically polymerizable functional groups are covalently bonded to polymers other than the polyolefin component of the composition, wherein the polymers to which the functional groups are bonded are blended with said polyolefin component.

In another embodiment, the cationically polymerizable functional groups are added as separate functional monomers or oligomers, which may be preferentially grafted to the polyolefin component prior to, or in-situ with, melt processing of the finished article. A peroxide initiator, such as dicumyl peroxide, may be used to promote the grafting reaction, though grafting may also be initiated as a result of UV irradiation of the article. Examples of functional monomers and oligomers include epoxidized vegetable oils and esters such as epoxidized soybean oil, epoxidized octyl soyate and methyl epoxy lindseedate, epoxidized alpha olefins including those ranging in molecular chain length $C_{10}$ to $C_{30}$, epoxidized polybutene, cycloaliphatic epoxides such as 3,4-epoxycyclohexylmethyl-3,4-epoxycyclohexane carboxylate and bis-3,4-(epoxycyclohexylmethyl) adipate, epoxy acrylates and methacrylates such as bisphenol A epoxy diacrylate and aliphatic epoxy acrylates, epoxy silanes, such as γ-glycidoxypropyltrimethoxy silane, oxetanes such as 3-ethyl-3-hydroxymethyl oxetane, and vinyl ethers such as octadecyl vinyl ether, butanediol divinyl ether, triethyleneglycol divinyl ether, and vinyl ether terminated esters and urethanes.

The functional component is added in an amount which is sufficient to provide the composition or a shaped article produced therefrom with thermoset properties, once the composition or article is crosslinked by UV radiation. For example, the cationically polymerizable functional groups may be added to the composition in an amount ranging from 0.1 to 50 percent by weight, preferably in the range from 1 to 20 percent by weight.

Cationic Photoinitiator:

The cationic photoinitiator may be a radiation-sensitive onium salt, and may be selected from the group comprising radiation-sensitive diazonium, halonium, iodonium, sulphonium and sulphoxonium salts.

Examples of radiation-sensitive onium salts include aryldiazonium salts, aryliodonium salts, diaryliodonium salts, alkylaryliodonium salts, arylsulphonium salts, triarylsulphonium salts, diarylbromonium salts, triarylselenonium salts, thioxanthonium salts, triarylsulphoxonium salts, aryloxysulphoxonium salts, dialkylacylsulphoxonium salts, dialkylphenacylsulphonium salts and dialkyl-4-hydroxyphenylsulphonium salts.

In one embodiment, the cationic photoinitiator is selected from triarylsulphonium hexafluorophosphate, and diaryliodonium hexafluoroantimonate.

Alternatively, the cationic photoinitator may be selected from one or more members of the group comprising iron arene complexes, ferrocenium salts, thiopyrylium salts, sulphonyloxy ketones, acyl silanes and silyl benzyl ethers.

Further, the cationic photoinitiator may be combined with an organic carrier solvent such as an alkyl or alkylene carbonate, acetate or propionate. Examples of these include ethylene carbonate, propylene carbonate, diethyl carbonate, dimethyl carbonate, ethyl methyl carbonate, butylene carbonate methyl acetate, ethyl acetate, ethyl propionate, and methyl propionate.

The cationic photoinitiator is added in an amount effective to initiate UV-crosslinking of the composition or a shaped article produced from the composition. For example, the cationic photoinitiator may be added to the composition in an amount ranging from 0.1 to 10 percent by weight, preferably in the range from 0.5 to 5 percent by weight.

Free-Radical Polymerizable Functional Component:

The UV-curable composition according to the invention may further comprise free-radical polymerizable functional groups such as acrylates and methacrylates, preferably covalently bonded to the polyolefin component of the formulation. Examples include polyolefins modified with acrylates, methacrylates, and glycidyl methacrylates, and polyfunctional monomers and oligomers such as acrylates and methacrylates, including polyester, polyol, epoxy and polyether acrylates and methacrylates.

The free-radical groups are added in an amount effective to accelerate curing of the composition or a shaped article produced from the composition. For example, the free-radical groups may be added to the composition in an amount ranging from 0 to 50 percent by weight, preferably in the range from 1 to 20 percent by weight.

Free-Radical Photoinitiator:

The UV-curable polymer composition according to the invention may further comprise a free-radical photoinitiator to increase the initiation rate of crosslinking and to maximize cure. It will be appreciated that the free-radical photoinitiator may optionally be added to the composition, whether or not the composition also includes a free-radically polymerizable component.

The free-radical photoinitiator may be selected from one or more members of the group comprising benzophenones, acetophenones, benzoin ethers, benzils, benzylketals, benzoyl oximes, aminobenzoates, aminoketones, hydroxyketones, ethylamines, ethanolamines, alkylphenones, anthracenes, anthraquinones, anthrachinones, xanthones, thioxanthones, quinones, fluorenones, peroxides, and acylphosphine oxides. Examples of free-radical photoinitiators include benzophenone, 2,2-diethoxyacetophenone, 1-hydroxycyclohexylphenyl ketone, benzyl dimethylketal, and 2,4,6-trimethylbenzoyldiphenylphosphine oxide.

The free-radical photoinitiator is added in an amount effective to accelerate curing of the composition or a shaped article produced from the composition. For example, the free-radical photoinitiator may be added to the composition in an amount ranging from 0 to 10 percent by weight, preferably in the range from 0.5 to 5 percent by weight.

Functional Additive:

The UV-curable polymer composition according to the invention may further comprise an effective amount of a functional additive as a crosslinking accelerator, promoter, sensitizer, or chain transfer agent.

The functional additive may be selected from the group comprising mono and polyfunctional acrylates and methacrylates, including polyester, polyol, epoxy and polyether acrylates and methacrylates, allylics, cyanurates, maleimides, thiols, alkoxysilanes, and hydroxyl-containing compounds such as hydroxyketones, alcohols, diols and polyols. Examples of specific functional additives include trimethylol propane triacrylate, trimethylol propane trimethacrylate, tetramethylol tetraacrylate, pentaerythritol triacrylate, ethylene glycol dimethacrylate, triallyl cyanurate, triallyl isocyanurate, vinyl trimethoxysilane, dimercaptodecane, diallyl maleate, N,N-(m-phenylene)-bismaleimide, 1,4-butanediol, ethylene glycol, polypropylene glycol, 1-hydroxy cyclohexyl phenyl ketone, and polycaprolactone.

The functional additive is added in an amount effective to accelerate and maximize curing of the composition or a shaped article produced from the composition. For example, the functional additive may be added to the composition in an amount ranging from 0.1 to 20 percent by weight, preferably in the range from 0.5 to 5 percent by weight.

Compatibilizers:

The UV-curable polymer composition according to the invention may further comprise an effective amount of a compatibilizer selected from one or more members of the group comprising: polyethylenes and polypropylenes; ethylene-propylene copolymers; ethylene-propylene diene elastomers; crystalline propylene-ethylene elastomers; thermoplastic polyolefin elastomers; metallocene polyolefins; cyclic olefin copolymers; polyoctenamers; copolymers of ethylene with vinyl acetate, vinyl alcohol, and/or alkyl acrylates; polybutenes; hydrogenated and non-hydrogenated polybutadienes; butyl rubber; polyolefin ionomers; polyolefin nanocomposites; block copolymers selected from the group comprising styrene-butadiene, styrene-butadiene-styrene, styrene-ethylene/propylene and styrene-ethylene/butylene-styrene; and all of the above optionally modified with reactive functional groups selected from the group consisting of silanes, acrylic acids, methacrylic acids, acrylates, methacrylates, glycidyl methacrylates, epoxies, hydroxyls, and anhydrides.

The compatibilizer is added in an amount effective to enhance miscibility of the composition components and provide optimum mechanical properties of the finished article. For example, the compatibilizer may be added to the composition in an amount ranging from 1 to 50 percent by weight, preferably in the range from 1 to 20 percent by weight.

Antioxidants and Stabilizers:

The UV-curable polymer composition according to the invention may further comprise one or more antioxidants and heat stabilizers to prevent degradation of the composition during melt processing and subsequent heat aging of the final product. Examples of suitable antioxidants and heat stabilizers include those classes of chemicals known as hindered phenols, hindered amines, phosphites, bisphenols, benzimidazoles, phenylenediamines, and, dihydroquinolines. It should also be noted that these antioxidants and stabilizers, if added in excessive amounts, may become "radiation scavengers", acting to limit the effectiveness of the radiation to induce the desired crosslinking reaction and the resultant degree of crosslinking obtainable for a given radiation dosage. Also, the effectiveness of cationic photoinitiators can be adversely affected by the presence of basic compounds, such as amines, for example.

The addition of antioxidants and stabilizers is dependent upon the required degree of thermal stability required in the final article, but they are typically added in an amount ranging from 0.1 to 5 percent by weight of the total composition.

Foaming Agents:

The UV-curable polymer composition according to the invention may further comprise one or more foaming agents for the preparation of foamed or thermally insulative formulations. Examples of suitable foaming agents include one or more members of the group comprising sodium bicarbonate, citric acid, tartaric acid, azodicarbonamide, 4,4-oxybis(benzene sulphonyl)hydrazide, 5-phenyl tetrazole, dinitrosopentamethylene tetramine, p-toluene sulphonyl semicarbazide, carbon dioxide, nitrogen, air, helium, argon, aliphatic hydrocarbons such as butanes, pentanes, hexanes and heptanes, chlorinated hydrocarbons such as dichloromethane and trichloroethylene, hydrofluorocarbons such as dichlorotrifluoroethane, and hollow microspheres, including glass, polymeric or ceramic microspheres.

The foaming agent is added to the composition in an amount suitable to achieve a desired degree of foaming, which depends somewhat on the intended use of the foamed composition. A typical degree of foaming is in the range from 10 to 50 percent by volume.

Fillers and Flame Retardants:

The UV-curable polymer composition according to the invention may further comprise one or more fillers and/or flame retardants for improved performance or cost.

Fillers may be selected from one or more members of the group comprising calcium carbonate, kaolin, clay, mica, talc, silica, wollastonite, barite, wood fibres, glass fibres, glass, polymer and ceramic microspheres, carbon black, nanofillers, and metal oxides such as antimony trioxide, silica and alumina.

Flame-retardants may be selected from one or more members of the group comprising halogenated flame-retardants such as aliphatic, cycloaliphatic and aromatic chlorinated and brominated compounds, and halogen-free flame-retardants such as aluminium trihydrate, organic phosphates, phosphorus-nitrogen compounds, and zinc borate.

The level of filler or flame-retardant added is dependent upon the cost and performance requirements of the finished article.

Process

The composition according to the invention is prepared by first blending the aforementioned components. This can be performed either as a separate step prior to melt processing of the finished article, or simultaneously with melt processing of the finished article, using a multi-component metering system, for example.

When performed as a separate prior step, the components are preferably melt blended by a machine specifically designed for that purpose, such as a continuous single-screw or twin-screw extrusion compounder, kneader, or internal batch mixer.

If it is required to graft the functional component to the polyolefin component using a peroxide initiator, for example, this is best accomplished as a separate step prior to melt processing and forming of the finished article, in an extruder, mixer, or reactor specifically designed for the grafting operation. The blended or grafted composition may then be pelletized and stored for subsequent melt processing into the desired finished article.

In the case of extrusion processing, it is preferable that the components are added as pelleted solids. This is typically the supplied form of the polyolefin components or polymeric compatibilisers described above. However, since many of the additives mentioned above, and particularly the antioxidants, stabilizers, fillers and flame-retardants, are naturally occurring powders, it is preferable that a pelleted masterbatch be prepared beforehand using a compatible polymer as the carrier or binder for the additives. Alternatively, it may be possible to combine the compounding and extrusion processing operation into a single step if the extruder used is a so-called compounding extruder, such as a twin-screw extruder, or kneader. Care is required here to ensure that full dispersion of the additives has occurred before the material reaches the extrusion forming die, and that any melt flow fluctuations have been eliminated. A gear pump or static mixing device installed between the end of the extruder screw and the entrance to the extruder die may also be required.

In cases where the functional monomers or oligomers, photoinitiators and crosslinking accelerators are liquids, it is preferable to mix these directly with the molten polymer composition. For example, in a single-screw extrusion operation this would be accomplished using a screw design having a decompression zone approximately midway along its length, at which point the liquid additives are injected into the polymer melt stream. Alternatively, the liquid additives may be coated onto the polymer pellets in a multi-component blender installed above the main feed port of the extruder. Another method of incorporating liquid additives would be to first imbibe them into a porous polymeric carrier, in which case they can then be effectively handled in the same manner as a solid, pelleted polymer.

In all cases it is important to homogeneously distribute the photoinitiators and accelerators within the polymer melt and to minimize loss of these additives through volatilization. The design of the extruder screw is important to achieve proper mixing and conveying of the components, and it may be necessary to incorporate barrier flights and mixing elements. Additionally, a static mixing attachment may be inserted between the end of the screw and the die. Alternatively, a twin-screw extruder having separate and interchangeable screw elements may be used.

Melt processing and forming of the composition is performed by extrusion and moulding techniques commonly used in the industry. Examples of extruded articles include pipes, pipe coatings, sheet, tubing, foams, and electrical insulation. In some preferred embodiments, the composition may be co-extruded or laminated with other materials of similar or dissimilar compositions to form laminate structures having discrete but intimately bonded layers, with each layer having different functional properties. For example, an adhesive-coated polymer sheet can be produced by co-extruding or laminating the composition with an adhesive. In other examples, the composition may be laminated with less expensive or non-crosslinkable layers, or it may be extruded atop a corrosion-protection layer, or layers, of a steel pipe thereby providing a multilayer pipe coating with a UV crosslinkable top layer. Molded articles can be produced by injection, compression or blow molding, and examples include electrical insulating articles such as end-caps, splice connectors, and break-out boots.

Once formed, the article is crosslinked by UV radiation. The invention allows that this step be accomplished at the same time as, and on line with, the processing and forming step after the material has solidified or crystallized. For example, it is possible to install the UV radiation source immediately after the sizing and cooling operation on an extrusion line, but before the final product wind-up station. The product does not therefore require a separate, off-line crosslinking step subsequent to the processing or forming operation, thereby significantly reducing processing costs and improving product throughput and manufacturing plant capacity.

Crosslinking is the formation of permanent covalent bonds between individual polymer chains which act to bind the polymer chains together and prevent them from irreversibly separating during subsequent heating. It is this crosslinked structure which, while retaining the elastomeric nature of the material, renders the material thermoset and resistant to melting which, in turn, is a desirable property for producing heat-shrinkable articles, as discussed below. Crosslinking also provides the article with excellent thermal and hot deformation resistance, allowing it to maintain mechanical toughness and integrity at high service temperatures.

The UV radiation source, or sources, comprises a lamp, or a series of lamps, and reflectors positioned along the length above and/or below, or circumferentially around, the formed article. The lamps should emit radiation in the wavelength range 100 to 500 nanometres and more particularly in the range 200 to 400 nanometres. The emission spectrum of the UV source should match the absorption spectrum of the UV photoinitiator as closely as possible to maximize the generation of photoinitiating species. Medium to high pressure mercury vapour lamps are most commonly used, typically either electric arc or microwave discharged. Rare gas, such as xenon, lamps can also be used. In the case of mercury lamps, the addition of metal halides can intensify the output of certain specific wavelengths. In addition to the wavelength, other factors to consider for optimum irradiation are the intensity of the UV radiation, dictated by the energy output of the lamp (typically 30 to 200 W/cm), the geometry of the lamp reflectors (typically elliptical or parabolic), the distance of the article from the UV source, and the dosage, which is also related to the rate of conveyance of the article through the UV radiation.

As mentioned above, crosslinked articles produced according to the invention, such as sheet, tubing and moulded shapes, can be rendered heat-shrinkable since they exhibit the thermoset property of not melting when heated to a temperature close to or above the crystalline melting point of the highest melting point component. This is important because the crosslinked structure allows the article to be stretched with minimal force and without melting, and to retain its mechanical integrity, when heated to this temperature. The hot article is fixed in this stretched state by rapidly cooling it to below the crystalline melting point while holding the article in its stretched position, the re-formed rigid crystalline regions of the polymeric components of the material preventing the article from spontaneously recovering to its original dimensions. Stretching of the article can be accomplished by mechanical, pneumatic or hydraulic means. Cooling the article in its stretched state may be accomplished by a cooling medium such as air, water or other heat-transfer medium.

Subsequent re-heating of the stretched article above the melting point will cause the crystalline regions to re-melt and the structure to elastomerically recover to its original unstretched dimensions. The crosslinked structure provides the initial recovery force and again ensures that the article does not melt and that it maintains its mechanical integrity.

The heating, stretching and cooling steps thus described for the production of heat-shrinkable articles may be accomplished either as a subsequent separate operation, or on-line with the processing, forming and UV crosslinking operation described earlier.

The degree of crosslinking is quantified through gel fraction and hot tensile strength measurements. The gel fraction is the quantity of crosslinked polymer remaining after any uncrosslinked fraction has been removed by refluxing in hot solvent, such as decahydronaphthalene or xylene. This gives information on the extent or amount of the crosslinked network but not the density or strength of the network. A high gel fraction does not necessarily indicate robust performance of the crosslinked material above the melting point. For this, a measurement of the tensile strength above the melting point of the polymer is necessary, since crosslinking is primarily restricted to the amorphous regions of the polymer. The hot tensile strength, therefore, provides information on the mechanical behaviour of the material above the melting point and provides insight into properties such as the heat-recovery characteristics and hot deformation resistance of the crosslinked product.

The invention is further illustrated by way of the following examples:

EXAMPLE 1a

A functional ethylene terpolymer (E-MA-GMA) containing 24% by weight methyl acrylate and 8% by weight glycidyl methacrylate and of density 0.94 g/cm$^3$ and melt flow index 6 dg/min. was blended with an ethylene propylene diene terpolymer (EPDM) of density 0.908 g/cm$^3$ and melt flow index 1.0 dg/min., a cationic photoinitiator comprising triarylsulphonium hexafluorophosphate in propylene carbonate, a free-radical photoinitiator comprising 1-hydroxy-cyclohexylphenylketone and benzophenone, and a trimethylolpropane triacrylate crosslinking promoter, in the amounts shown in Table 1. The liquid cationic photoinitiator, free-radical photoinitiator and crosslinking promoter were imbibed into a porous HDPE carrier at a ratio of approximately 2:1 to aid blending with the polymeric components. Blending was accomplished with a tumble blender, ribbon blender, high-speed blender, or multi-component feeding system.

The blended components were fed through a 24:1 L/D single-screw extruder, equipped with a polyethylene mixing screw and single-layer sheet die, and extruded at a melt temperature of approximately 140° C. into sheet of thickness approximately 1.2 mm. The extruded sheet was fixed to the required dimensions of width, thickness and orientation by passing it through a chilled, 3-roll calendering stack. The cooled, solidified sheet was then conveyed at a distance of 5 cm. beneath, and at a speed of 200 cm/min. through, a UV radiation source comprising a Type D medium pressure mercury lamp operating at a wavelength of 250 to 400 nm. and about 80 W/cm intensity.

The UV crosslinked sheet was then tested after 24 hours to determine the degree and density of crosslinking achieved, and for the mechanical properties indicated in Table 2.

The UV crosslinked sheet was further re-heated to a temperature of approximately 150° C. and then stretched by approximately 30% in length using a mechanical stretcher. Whilst in this stretched state, the sheet was rapidly cooled to below the crystalline melting points of the polymers comprising the composition in order to fix the sheet at the stretched dimensions. The heat-shrinkable sheet thus prepared was subsequently laminated with a layer of hot-melt adhesive and heat-recovered over a welded steel pipe joint.

EXAMPLE 1b

The molten extruded sheet of Example 1a was wrapped circumferentially around the surface of a rotating steel pipe previously coated with an epoxy-based corrosion protection layer, and UV crosslinked using a series of UV lamps positioned circumferentially around the pipe.

EXAMPLE 1c

The composition of Example 1a was extruded through an annular die, the tube or pipe thus formed being cooled and UV crosslinked as described above. The crosslinked tube or pipe may subsequently be rendered heat-shrinkable by re-heating, stretching, and cooling as described above.

EXAMPLE 1d

The composition of Example 1a was compression moulded into an electrical cable end-cap, cooled and then UV crosslinked. The crosslinked end-cap was subsequently re-heated, stretched and cooled to render the end-cap heat-shrinkable.

EXAMPLE 2

This example follows Example 1 except that the crosslinking promoter is eliminated from the composition.

EXAMPLE 3

This example follows Example 1 except that the EPDM component is replaced by a HDPE of density 0.947 g/cm$^3$ and melt flow index 0.28 dg/min.

EXAMPLE 4

This example follows Example 1 except that the free-radical photoinitiator and crosslinking promoter are eliminated from the composition.

EXAMPLE 5

This example follows Example 1 except that the amount of E-MA-GMA is reduced and the EPDM component is replaced by a HDPE of density 0.947 g/cm$^3$ and melt flow index 0.28 dg/min.

EXAMPLES 6, 7 AND 8

These examples examine the effect of incorporating antimony trioxide into the composition. With the exception of the antimony trioxide addition, Examples 6 and 7 follow Examples 1 and 4, respectively, whereas Example 8 follows Example 2, but also eliminates the cationic initiator.

EXAMPLES 9 AND 10

Examples 9 and 10 follow Example 1 except that the EPDM component is replaced by a HDPE of density 0.947 g/cm$^3$ and melt flow index 0.28 dg/min, and the E-MA-GMA is replaced by an epoxy-acrylate oligomer in order to examine the effect of incorporating the cationically polymerizable functional component as a separate oligomer. Example 10 differs from Example 9 in that it also includes dicumyl peroxide as a grafting initiator for said oligomer.

Examples 2-10 are included for comparative purposes. The compositions were prepared by mixing the components indicated in Table 1 using a Brabender laboratory internal mixer set at a temperature of approximately 200° C. The mixed compositions were then pressed into plaques of approximate thickness 1.0 mm., and UV crosslinked as described in Example 1. All amounts shown in Table 1 are in parts by weight of the respective compositions.

TABLE 1

Compositions

| Ingredient | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| E-MA-GMA | 50 | 50 | 50 | 50 | 25 | 45 | 45 | 45 | | |
| EPDM | 50 | 50 | | 50 | | 45 | 45 | 45 | | |
| HDPE | | | 50 | | 75 | | | | 100 | 100 |
| Cationic Initiator | 1 | 1 | 1 | 1 | 1 | 1 | 1 | | 1 | 1 |
| Free-Radical Initiatior | 1.5 | 1.5 | 1.5 | | | 1.5 | | 1.5 | | |
| Crosslinking Promoter | 1 | | 1 | | 1 | 1 | | | | |
| Antimony Trioxide | | | | | | 10 | 10 | 10 | | |
| Epoxy-Acrylate | | | | | | | | | 2 | 2 |
| Dicumyl Peroxide | | | | | | | | | | 0.08 |

TABLE 2

Properties

| Property | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Gel Fraction (%) | 73 | 74 | 47 | 69 | 30 | 71 | 55 | 49 | 4 | 10 |
| Hot Tensile Strength @ 200° C. and 100% Elongation (psi) | 68 | 58 | 40 | 97 | 28 | 100 | 110 | 6 | 1 | 9 |
| Ultimate Tensile Strength @ 23° C. (psi) | 14 | 17 | 15 | 15 | 23 | 11 | 15 | 6 | 33 | 29 |
| Ultimate Elongation @ 23° C. (%) | 300 | 300 | 310 | 300 | 400 | 320 | 310 | 570 | 840 | 280 |

What is claimed is:

1. A process for preparing an ultraviolet-crosslinked, thermoset article or coating, comprising:
   (a) forming a blend comprising:
      (i) a polyolefin selected from one or more members of the group consisting of polyethylene, polypropylene, copolymers of polyethylene, terpolymers of polyethylene and copolymers of polypropylene, wherein the polyolefin includes cationically polymerizable functional groups covalently bonded to the polyolefin;
      (ii) a cationic photoinitiator in an amount effective to initiate curing of said composition; and
      (iii) free-radical polymerizable functional groups in an effective amount to accelerate curing of said composition, wherein the free-radical polymerizable functional groups are covalently bonded to the polyolefin;
   (b) melt processing the blend to produce a melt-processed article or coating having a first set of dimensions;
   (c) cooling the melt-processed article or coating to a solid state; and
   (d) crosslinking the melt-processed article or coating by exposure to ultraviolet radiation to thereby produce said ultraviolet-crosslinked, thermoset article, wherein the crosslinking imparts thermoset characteristics to the article or coating such that, when the article or coating is heated to a temperature above the crystalline melting point of the polyolefin, it is softened but does not become liquid.

2. The process of claim 1, further comprising:
   (e) heating the ultraviolet-crosslinked, thermoset article to a first temperature at which it is softened but not melted;
   (f) stretching the softened article such that the article is expanded beyond the first set of dimensions; and
   (g) cooling the stretched article to a second temperature below the temperature at which the article is softened while holding the article in its stretched form.

3. The process of claim 2, wherein the heating step (e), the stretching step (f), and the cooling step (g) are performed on-line immediately following the processing step (b), the cooling step (c), and the crosslinking step (d).

4. The process of claim 1, wherein steps (a) and (b) are performed simultaneously.

5. The process of claim 1, wherein step (a) is performed prior to step (b) using a machine selected from the group consisting of a continuous twin-screw compounder, a kneader and an internal batch mixer.

6. The process of claim 1, wherein melt processing step (b) comprises extruding or molding.

7. The process of claim 1, wherein the ultraviolet radiation has a wavelength of 200-500 nm.

8. The process of claim 1, wherein crosslinking step (d) is performed on-line immediately following the melt processing step (b) and cooling step (c).

9. The process of claim 1, wherein the polyolefin is selected from the group consisting of polyethylene, copolymers of polyethylene and terpolymers of polyethylene.

10. The process of claim 9, wherein the polyethylene is selected from one or more members of the group consisting of very low density polyethylene (VLDPE), low density polyethylene (LDPE), linear low density polyethylene (LLDPE), medium density polyethylene (MDPE), linear medium density polyethylene (LMDPE) and high density polyethylene (HDPE).

11. The process of claim 9, wherein the copolymers of polyethylene are selected from one or more members of the group consisting of ethylene-propylene, ethylene-butene, ethylene-hexene, ethylene-octene, ethylene vinyl acetate, ethylene vinyl alcohol, ethylene methyl acrylate, ethylene ethyl acrylate, and ethylene butyl acrylate.

12. The process of claim 9, wherein the terpolymers of polyethylene are selected from one or more members of the group consisting of ethylene-methyl acrylate-maleic anhydride terpolymer; ethylene-methyl acrylate-glycidyl methacrylate terpolymer; ethylene-ethyl acrylate-maleic anhydride terpolymer; ethylene-ethyl acrylate-glycidyl methacrylate terpolymer; ethylene-butyl acrylate-maleic anhydride terpolymer; ethylene-butyl acrylate-glycidyl methacrylate terpolymer; ethylene-propylene-diene terpolymers; ethylene-propylene-maleic anhydride terpolymers; and ethylene-propylene-glycidyl methacrylate terpolymers.

13. The process of claim 1, wherein the cationically polymerizable functional groups originate from a reactive compound selected from the group consisting of glycidyl methacrylates, glycidyl ethers, vinyl ethers, divinyl ethers, epoxides, diepoxides, oxazolines, oxetanes, epoxy acrylates, epoxy silanes, epoxy siloxanes, polyols and combinations thereof.

14. The process of claim 1, wherein the polyolefin comprises an ethylene-methyl acrylate-glycidyl methacrylate terpolymer.

15. The process of claim 1, further comprising the step of combining the blend formed in step (a) with a compatibilizer selected from the group consisting of: polyethylenes; polypropylenes; ethylene-propylene copolymers; ethylene-propylene diene elastomers; crystalline propylene-ethylene elastomers; thermoplastic polyolefin elastomers; metallocene polyolefins; cyclic olefin copolymers; polyoctenamers; ethylene-vinyl acetate copolymers; ethylene-vinyl alcohol copolymers; ethylene-alkyl acrylate copolymers; polybutenes; hydrogenated polybutadienes; non-hydrogenated polybutadienes; butyl rubber; polyolefin ionomers; polyolefin nanocomposites; styrene-butadiene block copolymers; styrene-butadiene-styrene block copolymers; styrene-ethylene/propylene-styrene block copolymers; styrene-ethylene/butylene-styrene block copolymers; and combinations thereof.

16. The process of claim 15, wherein the compatibilizer is selected from the group consisting of: polyethylenes, ethylene-propylene copolymers and ethylene-propylene-diene elastomers.

17. The process of claim 16, wherein the compatibilizer is an ethylene-propylene-diene elastomer.

18. The process of claim 15, wherein the compatibilizer comprises from 1-50 percent by weight of the composition.

19. The process of claim 1, wherein the polyolefin comprises from 10-98 percent by weight of the composition.

20. The process of claim 19, wherein the polyolefin comprises from 50-95 percent by weight of the composition.

21. The process of claim 1, wherein the free-radical polymerizable functional groups are selected from one or more members of the group consisting of acrylates and methacrylates.

22. The process of claim 1, wherein the blend formed in step (a) further comprises a free-radical photoinitiator in an effective amount to accelerate curing of said composition.

23. The process of claim 22, wherein the free-radical photoinitiator is selected from one or more members of the group consisting of benzophenones, acetophenones, benzoin ethers, benzils, benzylketals, benzoyl oximes, aminobenzoates, aminoketones, hydroxyketones, ethylamines, ethanolamines, alkylphenones, anthracenes, anthraquinones, anthrachinones, xanthones, thioxanthones, quinones, fluorenones, peroxides, and acylphosphine oxides.

24. The process of claim 1, further comprising the step of combining the blend formed in step (a) with a filler, wherein the filler comprises a metal oxide.

25. The process of claim 24, wherein the metal oxide comprises antimony trioxide.

26. A process for preparing an ultraviolet-crosslinked, thermoset article or coating, comprising:
(a) forming a blend comprising:
(i) a polyolefin comprising an ethylene-methyl acrylate-glycidyl methacrylate terpolymer, wherein the polyolefin includes cationically polymerizable functional groups covalently bonded to the polyolefin; and
(ii) a cationic photoinitiator in an amount effective to initiate curing of said composition;
(b) melt processing the blend to produce a melt-processed article or coating having a first set of dimensions;
(c) cooling the melt-processed article or coating to a solid state; and
(d) crosslinking the melt-processed article or coating by exposure to ultraviolet radiation to thereby produce said ultraviolet-crosslinked, thermoset article, wherein the crosslinking imparts thermoset characteristics to the article or coating such that, when the article or coating is heated to a temperature above the crystalline melting point of the polyolefin, it is softened but does not become liquid.

27. The process of claim 26, further comprising:
(e) heating the ultraviolet-crosslinked, thermoset article to a first temperature at which it is softened but not melted;
(f) stretching the softened article such that the article is expanded beyond the first set of dimensions; and
(g) cooling the stretched article to a second temperature below the temperature at which the article is softened while holding the article in its stretched form.

28. A process for preparing an ultraviolet-crosslinked, thermoset article or coating, comprising:
(a) forming a blend comprising:
(i) a polyolefin selected from one or more members of the group consisting of polyethylene, polypropylene, copolymers of polyethylene, terpolymers of polyethylene and copolymers of polypropylene wherein the polyolefin includes cationically polymerizable functional groups covalently bonded to the polyolefin; and
(ii) a cationic photoinitiator in an amount effective to initiate curing of said composition;
further comprising the step of combining the blend formed in step (a) with an ethylene-propylene-diene elastomer as a compatibilizer;
(b) melt processing the blend to produce a melt-processed article or coating having a first set of dimensions;
(c) cooling the melt-processed article or coating to a solid state; and
(d) crosslinking the melt-processed article or coating by exposure to ultraviolet radiation to thereby produce said ultraviolet-crosslinked, thermoset article, wherein the crosslinking imparts thermoset characteristics to the article or coating such that, when the article or coating is heated to a temperature above the crystalline melting point of the polyolefin, it is softened but does not become liquid.

29. The process of claim 28, further comprising:
(e) heating the ultraviolet-crosslinked, thermoset article to a first temperature at which it is softened but not melted;
(f) stretching the softened article such that the article is expanded beyond the first set of dimensions; and
(g) cooling the stretched article to a second temperature below the temperature at which the article is softened while holding the article in its stretched form.

30. The process of claim 28, wherein the compatibilizer comprises from 1-50 percent by weight of the composition.

* * * * *